Figure 1:
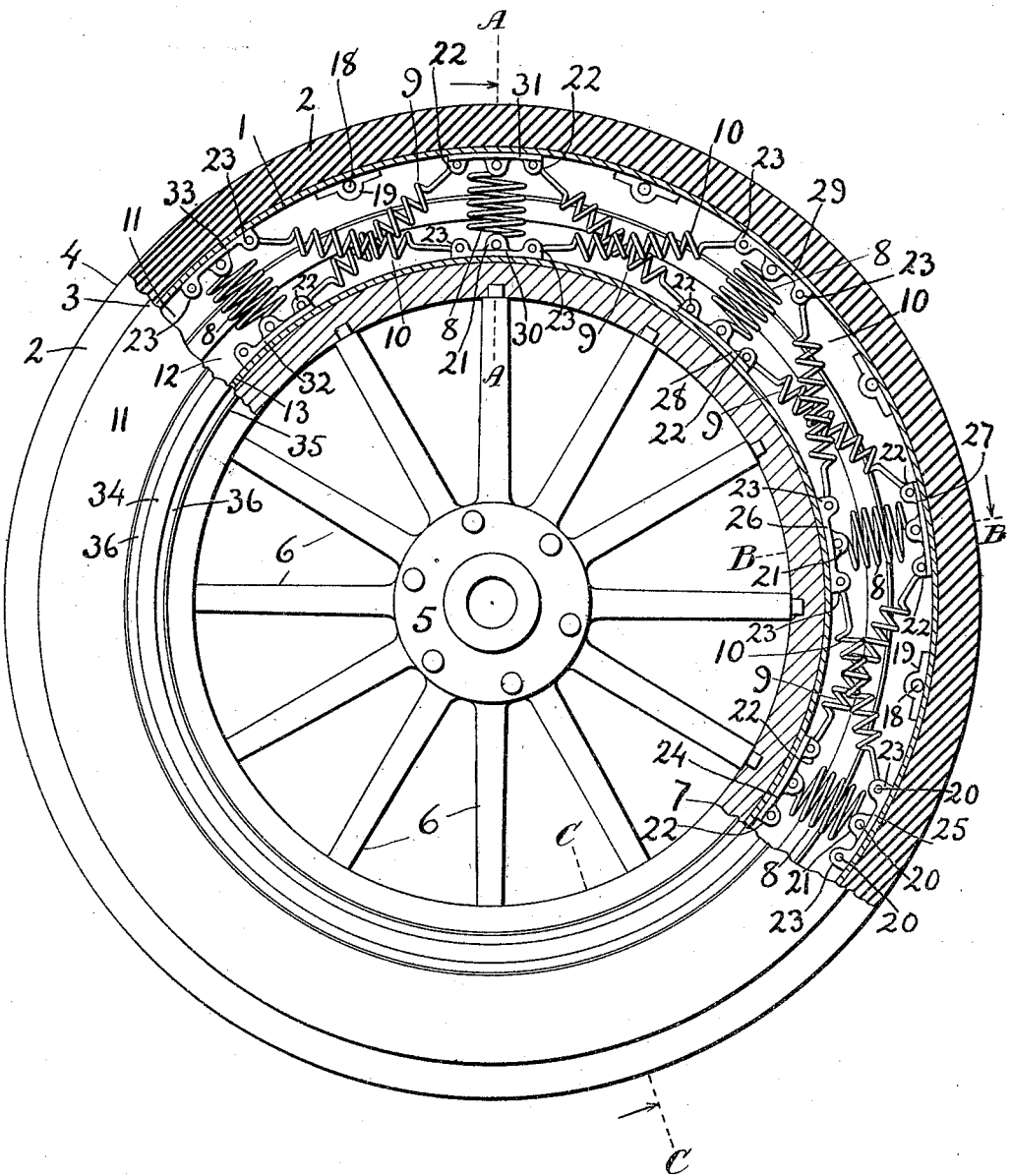

No. 876,826. PATENTED JAN. 14, 1908.
T. J. McCARTHY.
WHEEL TIRE.
APPLICATION FILED AUG. 24, 1906.

2 SHEETS—SHEET 1.

Witnesses:
James D. King
M. H. Wells.

Inventor:
Thomas James McCarthy
by A. H. Ste Marie
Atty.

No. 876,826. PATENTED JAN. 14, 1908.
T. J. McCARTHY.
WHEEL TIRE.
APPLICATION FILED AUG. 24, 1906.
2 SHEETS—SHEET 2.
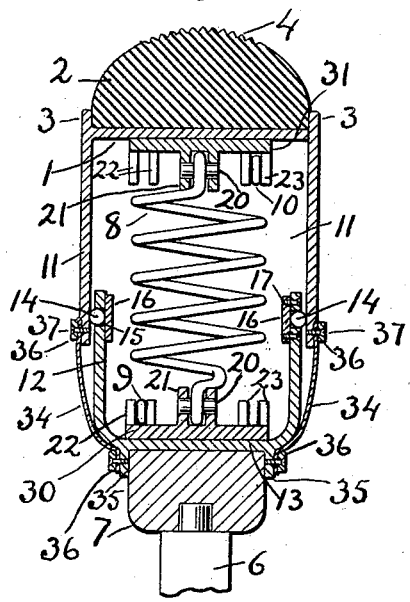
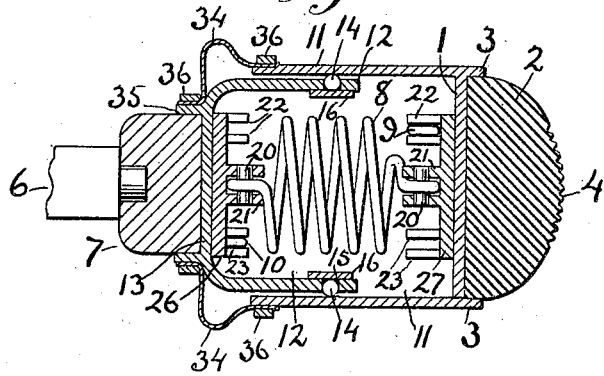
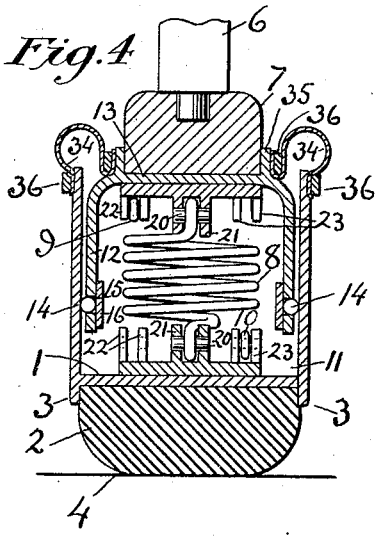
Witnesses:
James D. King
M. T. Wells
Inventor:
Thomas James McCarthy
by A. H. Ste Marie.
Atty.

UNITED STATES PATENT OFFICE.

THOMAS JAMES McCARTHY, OF LOS ANGELES, CALIFORNIA.

WHEEL-TIRE.

No. 876,826.  Specification of Letters Patent.  Patented Jan. 14, 1908.

Application filed August 24, 1906. Serial No. 331,915.

*To all whom it may concern:*

Be it known that I, THOMAS JAMES MC-CARTHY, a citizen of the United States of America, and a resident of the city of Los Angeles, in the county of Los Angeles and State of California, have invented certain new and useful Improvements in Wheel-Tires, of which the following is a specification.

The primary object of this invention is to provide a superior mechanical substitute for the pneumatic india-rubber tire. Secondarily, the invention aims to produce a wheel-tire capable of general application, that is, wherever resiliency in or about the tire is deemed a desirable feature.

The merits and demerits of the air-inflated tire are rather too well known to require being dilated upon herein, and it is nigh unto sufficiency, for the purposes of this specification, to state that, on the one hand, the almost universal adoption of the pneumatic wheel-tire for automobiles and similar vehicles shows it has been hitherto considered the best that could be procured for comfortable riding, while, on the other hand, the test of usage has proved it of limited usefulness and devoid of qualities which a perfect tire should possess.

It is recognized that the chief objection to the pneumatic tire is not so much the original cost thereof, though great, nor the never-ending expense of keeping it in repair, as its liability to puncture and collapse at most inopportune times and places, causing vexatious delays and discomfort which no amount of money can obviate or overcome, and necessitating irksome precautions such as the carrying of a kit of tools and repairing material, besides extra tires, which are just as likely to burst as those they will replace. For this reason, the automobilist will shun rough and rocky roads and refrain from riding his machine through localities which he would otherwise include in his circuit. The invention hereinafter described is specially intended to remedy this objection, by affording a tire practically immune from punctures or cuts and consequent disablement or destruction, and withal at reduced expense, both in first outlay and renovating disbursements.

A second undesirable characteristic of the inflatable tire will be found in that it is bulky, ponderous and cumbersome, and incidentally bereft of graceful configuration. This is due to its very nature and makeup, since enough material must be used in it to enable it to withstand at least ordinary wear and tear, and there has to be formed therein an air-space of adequate magnitude to admit of inflation to a useful extent. Now, as the cost of india-rubber is high, the tire manufactured from it, as a matter of course, is made of the smallest size available, and therefore the wheel, with the tire on, needs must be low, stubby, massive and of ungainly appearance. A dwarfish wheel means a low axle, and that also is open to criticism inasmuch as the gearing connected therewith must be placed nearer the ground than would be advisable often to have the same. And the lowness of wheel and axle further signifies a less circumference of tread with a greater number of revolutions in a given distance and correspondingly-increased friction. All of this can be avoided through the use of the present invention.

It may be added as a corollary, that the inevitable peripheral breadth and inherent flexibility of tread of the pneumatic tire cause it to squat where it touches the ground, upon which its wide bearing surface leaves a broad, webfootlike imprint, resulting in augmented friction on firm roads, which is antagonistic to speed, whereas on softer soil the spread of the tire superinduces skidding and is equally inimical to high velocity. A proper hold on the ground's surface is just as essential to celerity in traction as the avoidance of too great a frictional contact. The flattening of the tread at the point of contact also hinders in steering, as it prevents deflection at a sharp angle and making short turns, such as are now possible under the present improved conditions. Moreover, the external yielding of the pneumatic tire, as it touches the earth, merely produces a repulsion of air throughout the rest of the tire and has no tractive effect, it being an acknowledged fact that the pressure of fluids is the same in all directions, and therefore the air expansion makes itself felt backward as much as forward. The invention disclosed herein contemplates a tire having an entirely different action, intended to do away with the squatting, skidding, and sprawling, and destined to assist in the development of speed by causing the resilient portion of the tire to exert a pull on it in the direction of motion either way, that is, forward or backward.

Reference is made to the drawings hereto annexed for a detailed statement of the nature of this invention and of the manner in which it may be carried out in practice.

In the said drawings, Figure 1 is a side elevation, partly in section, of a wheel fitted with one form of this improved tire, the same being shown in an idle condition. Figs. 2, 3, and 4 are enlarged transverse sections of the tire and wheel-rim, respectively taken from the lines A— —A, B— —B, and C— —C of Fig. 1, and altered to illustrate the various positions assumed by the tire relatively to the wheel at different points in its cycle of revolution.

The same numerals are employed to indicate like parts throughout the specification and drawings.

This improved tire is made substantially rigid outwardly, which is best accomplished by making its main circular portion of metal, as sheet-steel stamped or otherwise suitably formed. The metallic circle, designated herein by the numeral 1, may appositely be equipped with a separate or separable tread 2, consisting of an outer band of hard vulcanized caoutchouc, or sole-leather, or composite pliable material, packed solid. Such a band may be shrunk on the metal or firmly set thereon between outwardly-turned vertical flanges 3. These parts admit of no flexure collectively, and taken together are calculated not to yield on the ground any more than a plain solid india-rubber tire would do, superficially. In design, the above-mentioned tread 2 is preferably a deep segment of a round band, the cross-sectional area of which need not be one-fourth that of the air-inflated tire; and on top the segment is ribbed or corrugated or studded throughout the circumference of the band, as suggested at 4, Figs. 2 and 3. This segmental band, applied with the convex side outward, affords all the desirable external resilience to the tire as proposed to be made, combined with toughness and durability. Its reduced, rotund, and partially roughened outline is deemed the most favorable to speedy traction, as it seems to render the tread's adhesion inversely proportional to the hardness of the ground, causing the tire to ride lightly on the firmer and to cling more to the softer, and thereby operating to avoid both dragging and slipping. It also favors steering through its limited width, which enables the wheel to be deviated from its course at the sharpest angles.

Unlike the pneumatic, the tire in this invention is separate and in some respects independent of the wheel, which may be of any preferred manufacture. An ordinary automobile wheel has been shown in Fig. 1, the same comprising, as usual, the hub 5, spokes 6, and felly 7. The wheel (of whatever type) is both supported and suspended within the tire by means of intermediate springs, so that it acquires, while revolving, a distinct, individual, eccentric motion in a vertical plane and acts as if it were floating in what might be termed an elastic circle or a buoyant annulus, which extending all around beyond the rim of the wheel, serves to absorb all jar and concussion resulting from the impact of the tire against any unevenness in the ground or obstacles thereon, irrespective of the coacting yieldability of the outer band 2, hereinbefore described. Vibration and shocks are thus taken up and diffused throughout the periphery, at the remotest points from the axle and therefore farthest from the points of connection with the vehicle body, a condition not only agreeable to the occupants of the vehicle, but likewise advantageous for the hauling of fragile wares, the transportation of explosives, and the like, as may be required either in the discharge of civil pursuits or the conduct of military operations. The method of supporting the wheel upon and suspending it by springs within the tire, as above intimated, will presently be described.

Three sets of springs are interposed between the tire and the wheel, namely, a central, radial set indicated by the numeral 8, and two peripheral, quasi-tangential series respectively numbered 9 and 10. These several springs (8, 9, 10) are incased in channels 11 and 12, one formed inwardly on the metallic circular portion 1 of the tire, and the other outwardly on a counter-band 13 of the wheel-rim, both channels being made preferably of the same metal and designed to fit loosely one within the other, with their sides lapping, as best seen in the detail views of the drawing. Ball-bearings 14 are placed between the contiguous sides of the two channels, as shown in these detail figures, for the dual purpose of avoiding friction during the vertical movement of the wheel within the tire and of maintaining the channels properly centered one with relation to the other. A limited number only of the bearing balls 14 need be used, and, as illustrated, they are conveniently lodged in holes 15, bored through the sides of the channel 12 and covered on the inside by small plates 16, screwed thereover, as at 17, Fig. 2, the balls being held on the outside by the lateral walls of the channel 11. One side of the latter-named channel is made removable (or both sides may be) to facilitate the assembling of the wheel and tire, with its sundry springs, ball-bearings, and parts thereto related. The sides may be secured in their relative positions in any suitable manner, for instance, by cross bolts 18 (Fig. 1) lying within clips 19, riveted or otherwise fastened to the inner face of the circle 1 of the tire; the sides or lateral walls of the channel abutting against the ends of the clips when the bolts are tightened.

One end of each of the aforesaid springs is attached to the tire and the other end to the rim throughout the circumference of the wheel. All springs are therefore anchored at both ends, and they are subjected to equal tensions in the radial and peripheral sets, respectively. The anchoring is done by a pivotal or flexible connection in each instance, the ends of the springs being conveniently looped over pins 20, between pairs of lugs 21, 22, and 23 that are provided on fittings or fixtures 24, 25, 26, 27, 28, 29, 30, 31, 32, and 33, secured at opposite points in the bottom parts of the channels 11 and 12. As shown, the lugs 21 are located centrally on the fittings, and with the pin in each pair constitute the anchorage for the radial springs 8, whereas the lugs 22 and 23 occupy the corners of the fittings, and with the pins therein make provision for the attachment of the peripheral springs 9 and 10. The drawings show lugs on the four corners of each fitting, which feature may be useful when applying the tire to the wheel, but it will be observed they are not all employed, as the springs in the series 9 and 10 are made to cross one another longitudinally of the tire and wheel-rim, between the several pairs of adjacent and opposite fittings. In addition to this, the springs are caused to run alternately in opposite directions in each of these two series, that is to say, from the rim to the tire and vice versa, each series, necessarily, on its own side of the fittings and of the central line of radial springs. Thus, as represented in Fig. 1, the four springs 9 appearing in the sectioned part thereof run from the fitting 24 to the fitting 27, thence consecutively to the fittings 28, 31, and 32, the four being attached at each end to lugs 22 on the remote side of the specified fittings, while the four springs 10 crossing them respectively extend from the fitting 25 to the fittings 26, 29, 30, and 33, all connected with lugs 23 on the near side of the fittings last mentioned. The several fittings, it will be seen, are spaced so as to bring the springs 9 and 10 therebetween on lines practically tangential to the tire and rim of the wheel.

The arrangement of springs above set forth fills divers useful purposes. First may be mentioned the universal distribution of strain through the periphery of the wheel, obtained by anchoring both ends of the springs (radial and tangential) in the manner described; which relieves compression by opposite tension and the reverse, the weight imposed at the hub being borne not only by the lowermost springs or those immediately adjoining, but taken up by the upper and intervening ones as well. This imparts holding strength and quickness of recoil to the aggregate springs. Secondly, the independent pivotal anchorage of the different springs renders them exempt from harmful torsion or flexure in the direction of their length, and insures for each, perfect freedom of action regardless of its ever-changing positions around the wheel. Thirdly, the peculiar disposition of the two sets of tangential springs, with every other one in each set adapted to pull in the same direction, and likewise alternating in the opposite course, operates to apply the rotating force evenly and in a continuous impulse on both sides of the wheel, from the rim to the tire or from the tire to the rim, as the case may be. One-half of these springs, it will be perceived, act during the forward revolution of the wheel, and the other half while it turns backward. For example, assuming the wheel is revolving clockwise and the construction to be as in Fig. 1, the springs 9 and 10 that run up and back from the fittings 24, 26, 28, and 30, will jointly exert a pull from the rim upon the tire in the direction of revolution. If the wheel be turned contra-clockwise, the springs 9 and 10 inclined upward and backward from the fittings 32, 30, 28, and 26 will perform the same function in the reverse direction. It will further be seen that the tangential or quasi-tangential alinement of the springs 9 and 10 adapts them for a substantially straight pull on the tire or wheel-rim in the direction of rotation either way, and the alternation of springs running opposite ways tends to offset any differential movement that might occur between the wheel-rim and the tire therearound.

Guards 34 are placed over the sides of the tire at the junctures of the channels 11 and 12, that is to say, where their lateral walls lap over one another. These guards consist of strips of stout flexible fabric, such as sailcloth, gum elastic, or other material suitably treated and worked so as to be unaffected by the elements, and which strips are tightly secured at their opposite edges against the borders of the channel 11 and upon flanges 35 of the band 13, where the same is fitted over the felly of the wheel. The edges of the strips are held in place each by a flat metallic ring 36 and countersunk screws 37, Fig. 2. The said guards are of ample width to allow for the full eccentric movement of the wheel within the tire, and not only ward off dirt, dust, water, and all foreign matter from the said junctures, but through their periodical folding and unfolding they also operate to shed or shake off the same and consequently keep the tire clean, with concomitant advantages.

I have now described what I consider the most complete and practicable form of my said improved tire. Nevertheless, it will be apparent to skilled mechanics that numerous changes can be effected therein without departing from its main structural principle. Let it be understood, therefore, that I do not wish to confine myself to the exact details of construction as herein exemplified, but that I lay claim broadly to all changes and modifications that come within the scope of my invention.

I claim:—

1. The combination with a wheel and a separate tire, of radial springs pivotally anchored at both ends therebetween, and similarly-anchored quasi-tangential springs alternately running in opposite directions at each side of the radial springs and crossing one another longitudinally of the tire and wheel-rim.

2. The combination of an inwardly-channeled tire, an outwardly-channeled wheel, oppositely-located fittings having a plurality of lugs and respectively secured at regular intervals in the channels of the tire and wheel-rim, radial springs flexibly anchored to central lugs on the opposite fittings, and peripheral springs running longitudinally of the tire and wheel-rim on each side of the radial springs and likewise connected with corner lugs of staggered fittings.

In witness whereof I have signed this specification in presence of two subscribing witnesses.

THOMAS JAMES McCARTHY.

Witnesses:
WM. B. WIGHTMAN,
A. H. STE. MARIE.